(No Model.) P. K. DEDERICK. 3 Sheets—Sheet 2.
BALING PRESS.
No. 583,462. Patented June 1, 1897.
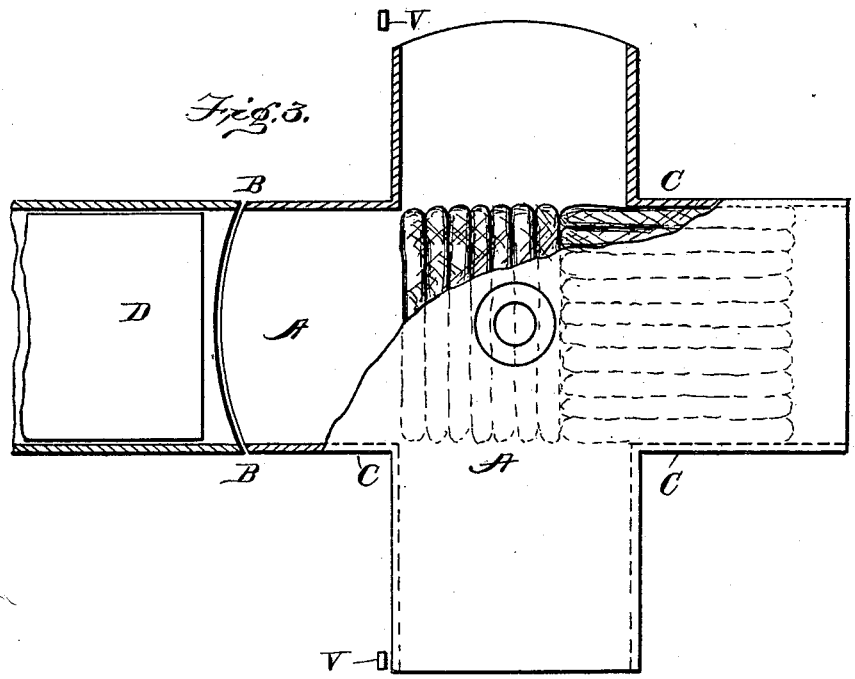
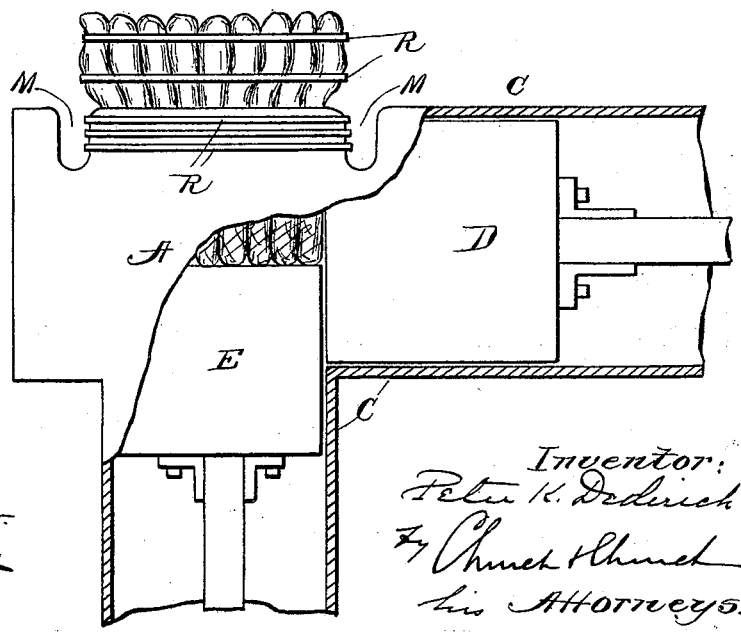

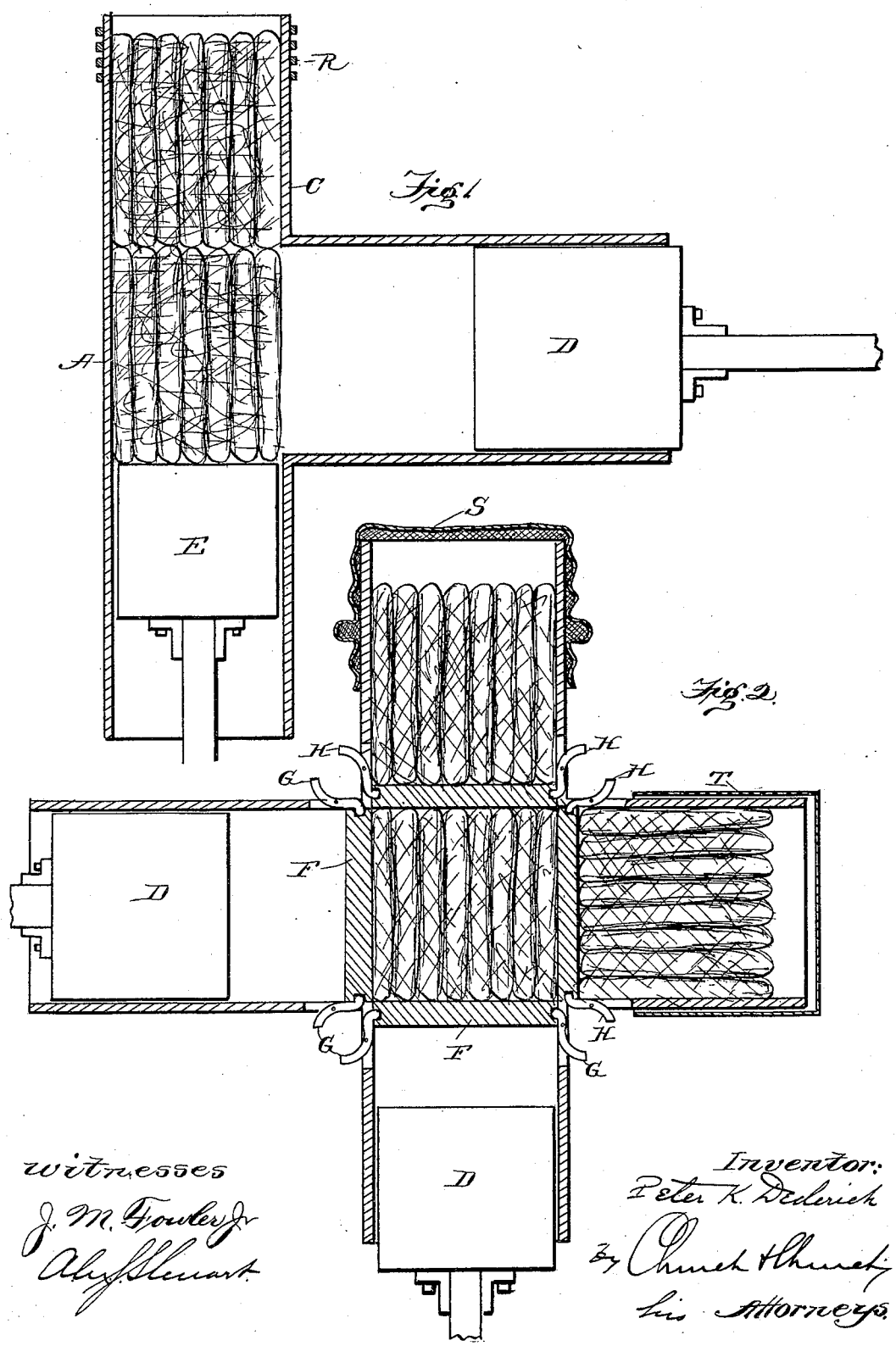

(No Model.)
P. K. DEDERICK.
BALING PRESS.
No. 583,462.  3 Sheets—Sheet 3.
Patented June 1, 1897.
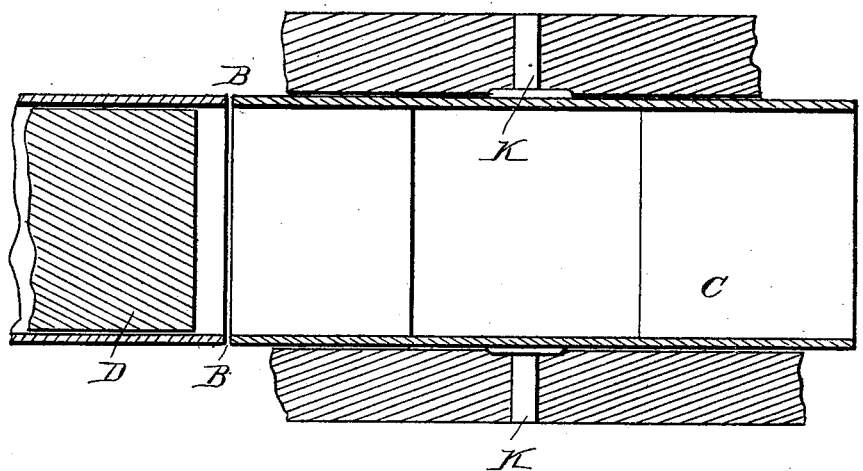

UNITED STATES PATENT OFFICE.

PETER K. DEDERICK, OF LOUDONVILLE, NEW YORK.

BALING-PRESS.

SPECIFICATION forming part of Letters Patent No. 583,462, dated June 1, 1897.

Application filed June 11, 1895. Serial No. 552,467. (No model.)

*To all whom it may concern:*

Be it known that I, PETER K. DEDERICK, of Loudonville, county of Albany, State of New York, have invented certain new and useful Improvements in Baling-Presses; and I do hereby declare the following to be a full, clear, and exact description of the same, reference being had to the accompanying drawings, forming a part of this specification, and to the letters of reference marked thereon.

In baling-presses as heretofore constructed the bales were either removed from the press, after being bound, by opening the box or case in which the bale was formed, as in all box-presses, or were ejected in the direction pressed by the operation of the press in forming another bale, as in the continuous press, in either case the bands being passed around and secured on the bale within the machine, whereas with my improved baling-press herein set forth the bale is forced out or ejected in a direction transverse to that in which it is pressed and while under pressure, and is ejected into the band, bands, or confining device or devices, instead of having the same put around the bale when in the press.

Figures 1, 2, 3, 4, and 5 illustrate my invention.

Similar letters represent similar parts.

A is a bale-forming chamber and receiving-box; C, the bale-depositing chamber from which it is ejected.

D is the traverser.

Fig. 1 illustrates a simple method of carrying my invention into practice. The loose material is deposited in the press-box A and condensed into the one end thereof by traverser D, to which power is applied in any suitable manner and the bale formed. This may be done in either of the well-known ways—*i. e.*, by a single charge sufficient to form a bale or by a series of charges to complete the bale in sections when it is held under pressure by the power or traverser, which is stopped at the limit of its stroke, and power is then applied to traverser E in any suitable manner to force the bale into the chamber C, so that the flakes or layers are lengthwise of chamber C instead of transverse the chamber, as always heretofore. Traverser E is now withdrawn to its former position and another bale formed in a similar manner, which is in turn forced from chamber A into chamber C, thus ejecting the previous bale, and the operation is thus continued.

It should be observed that the bale having been pressed in a direction transverse of chamber C its expansive force is exerted against its walls transversely, hence does not expand out of its end, and the walls of chamber C may be a thin-steel tube over which the bands R (preferably in the form of a hoop or square) for binding the bale may be slipped, and they are then moved off this tube on the bale, either by hand or automatically, at suitable intervals as the bale is being ejected, or a case of sacking or a bag S, Fig. 2, may be used where covering is desired, as in baling cotton, or a tube of wire-cloth or sheet metal T, Fig. 2, would answer the same purpose, either of the above being passed over the case C and drawn off by the bale or as the bale is ejected from chamber C, and the bale expands into the sacking, bag, or case as fast as ejected and may be thus retained without the use of other bands; but in either case, whether bands, bag, or case is used, the bale is passed from the case or chamber C into it.

The bale might be ejected endwise into the bands without the use of the chamber C by the use of the ordinary removable end and side doors of box-presses, and then recessing into the end of the pressing traverser and head to receive the bands, as shown at M, Fig. 4, so that when the bale is pressed and doors removed the bands may be placed around the end of the bale in the recesses at M and moved off at suitable intervals as the bale is ejected by traverser E, exactly as with use of the case C, and a sack-case or bag may also be thus applied.

In Fig. 2 the construction and operation are varied in that there are two ejecting-chambers C, and the press-box extends in two directions transversely of each other toward the two traversers D, which are operated by any suitable power alternately, and the bale thus pressed alternately from transverse directions is forced into chambers C alternately and endwise of its flakes or layers, as shown, and ejected into band or bands alternately, as heretofore described. Partition-followers are preferably used in this operation instead of stopping the power and traverser to retain the pressed bale, and these partitions F are held by retainers G G, so that they cannot expand back into the feed end of press-box A, and they are alternately forced across the chamber A in transverse directions in forming another bale and into the entrance of chambers C, where they are arrested by retainers H, which have beveled or rounded ends to bear against and slip along the bale, but catch into recesses in the edge of the partition-follower and retain them to form a rigid head to complete the bale against, after which the retainers are tripped to release the follower and eject the bale by forcing another from chamber A into chambers C, and the partitions thus pass out with the bales and are again passed into press-box A, following other bales. This construction requires two pressing-traversers to be operated by power mechanism and desirable for rapid work or a stationary machine, and to cheapen and make a lighter portable machine I pivot the common bale-forming chamber A at both top and bottom to a frame, as by pivots K, Figs. 3 and 5, thus allowing it to be moved a quarter-turn back and forth, carrying with it chambers C. Press-box A is separated or intersected at B B for rotating on pivots K, thus bringing the single traverser D alternately in line with the press-box A from transverse sides. The traverser may be actuated by any suitable power device and the traverser and power moved quarter-turn and back instead of the press-box with same result, the partitions, receiving-chambers, retainers, and operation otherwise being exactly the same as in the last preceding description, and being, in fact, the same, except the movement of the chamber, or the traverser and power, a quarter-turn back and forth to bring the transverse sides of press-box A alternately in line with the traverser and against a stop V, where it is secured, and the binding operation in all cases is exactly as heretofore described, the chambers C being the same and the flakes or layers and bale passing through it endwise in all cases, so that its expansive force is transversely of the chamber.

The chamber C may be an ordinary open side chamber or as shown, and it might be shortened to contain less than a bale or lengthened to contain more than one bale at a time, and the chamber may be adjustable to vary the resistance or friction, as also might chamber A be extended in direction of the pressing-traversers D, so as to contain one or more formed bales, preliminary to forcing them into the chamber C shown, all as in well-known press constructions, or there might be four chambers C and either used for forming or discharging bales and rotated in either direction instead of quarter-turn, as all that is required is to eject the formed bale from the press-box transversely of the direction in which it was pressed or in the direction of its layers or flakes, and the entire operation may be carried out either with or without the use of partition followers and retainers.

I do not herein claim all the devices, construction, and invention illustrated and described, much of the same being reserved for subsequent applications which it is my intention to file.

Having thus described my invention, what I claim as new is—

1. The combination of a press-case, having a feed-passage for the entrance of the material to be baled, and a discharge-passage at an angle to the first-named passage for the ejecting of the formed bale, of means for forcing the material into said feed-passage and forming the bale and for ejecting the formed bale transversely through the discharge-passage; substantially as described.

2. The combination of a press-case having passages intersecting each other at substantially right angles, with means for pressing the material and forming bales in said passages alternately, whereby the finished bales are ejected from the intersection of the passage transversely, substantially as described.

3. The combination of a press-case, having passages intersecting each other at substantially right angles, with means for alternately forcing the material to be baled into one passage to form a bale at the intersection of the passages, and for subsequently forcing material into the other passage to form a new bale against the one already formed, and to at the same time eject the last previously-formed bale; substantially as described.

4. The combination of a press-case, having a feed-passage for the entrance of the material to be baled, and a discharge-passage at an angle to the first-named passage for the ejection of the bale, of means for forcing the materials into said feeding-passage to form the bale, and for ejecting the formed bale transversely through the discharge-passage into bale-confining means, such as bands, within which the discharged bales are ejected and expand so as to be held thereby; substantially as described.

5. In combination with a press-case having passages intersecting each other at substantially right angles, with means for pressing the material to form bales in said passages alternately and movable partitions whereby the finished bales are divided, and ejected from the intersection of the passages transversely; substantially as described.

6. In combination with a press-case having passages intersecting each other at substantially right angles, with means for pressing the material to form bales in said passages alternately and movable partitions and retaining devices whereby the partitions dividing the bales are retained in position to close the intersecting passages alternately, to facilitate the transverse displacement of the bale; substantially as described.

PETER K. DEDERICK.

Witnesses:
F. X. CLEMENT,
M. LINACRE.